(12) United States Patent
Ehlers

(10) Patent No.: US 12,401,590 B2
(45) Date of Patent: Aug. 26, 2025

(54) SYSTEM AND METHOD FOR FORWARDING NETWORK TRAFFIC

(71) Applicant: Microchip Technology Incorporated, Chandler, AZ (US)

(72) Inventor: Kristian Ehlers, Copenhagen (DK)

(73) Assignee: Microchip Technology Incorporated, Chandler, AZ (US)

( * ) Notice: Subject to any disclaimer, the term of this patent is extended or adjusted under 35 U.S.C. 154(b) by 333 days.

(21) Appl. No.: 18/211,310

(22) Filed: Jun. 19, 2023

(65) Prior Publication Data

US 2024/0089202 A1   Mar. 14, 2024

Related U.S. Application Data

(60) Provisional application No. 63/404,736, filed on Sep. 8, 2022.

(51) Int. Cl.
*H04L 69/22* (2022.01)
*H04L 1/00* (2006.01)
*H04L 45/74* (2022.01)
*H04L 49/00* (2022.01)

(52) U.S. Cl.
CPC ............ *H04L 45/74* (2013.01); *H04L 1/0061* (2013.01); *H04L 49/30* (2013.01); *H04L 69/22* (2013.01)

(58) Field of Classification Search
CPC ......... H04L 69/22; H04L 47/32; H04L 45/00; H04L 51/216
See application file for complete search history.

(56) References Cited

U.S. PATENT DOCUMENTS

| 10,917,504 B1 | 2/2021 | Plenderleith |
| 2019/0289101 A1* | 9/2019 | Iizuka .................... H04L 69/22 |

FOREIGN PATENT DOCUMENTS

| EP | 3439210 A1 | 2/2019 | ............... H04L 1/00 |
| EP | 3893457 A1 | 10/2021 | ............. H04L 45/74 |

OTHER PUBLICATIONS

International Search Report and Written Opinion, Application No. PCT/US2023/025820, 11 pages, Oct. 9, 2023.

\* cited by examiner

*Primary Examiner* — Tu X Nguyen
(74) *Attorney, Agent, or Firm* — SLAYDEN GRUBERT BEARD PLLC

(57) ABSTRACT

A device for control of network traffic may include a plurality of edge interface circuit and internal interface circuits each coupled to one or more network components. The device may prepend frame identification information to received data frames and remove duplicate data frames when identification information is detected multiple times. The device may store frame identification information in a non-transitory memory device and perform a lookup operation to identify duplicate data frames and eliminate loops in the network.

18 Claims, 3 Drawing Sheets

SYSTEM AND METHOD FOR FORWARDING NETWORK TRAFFIC

PRIORITY

This application claims priority to commonly owned U.S. Patent Application No. 63/404,736 filed Sep. 8, 2022, the entire contents of which are hereby incorporated by reference for all purposes.

FIELD OF THE INVENTION

The present disclosure relates to forwarding of traffic in a computer network.

BACKGROUND

In a computer network, network components, including but not limited to switches and routers, are tasked with receiving data at their input ports, also termed ingress ports, and forwarding that received data through their output ports, also termed egress ports, and on to the proper destination. This process of sending incoming data on to the appropriate set of destinations is termed forwarding in computer networking.

In one type of network, commonly termed a store-and-forward (S&F) network, a network component may receive an incoming frame at its ingress port. The frame of data is received in its entirety before a forwarding decision is made. Once the entire frame of data is received and buffered, the network component will compare the Cyclic Redundancy Check (CRC) data included in the frame to determine the correctness of the received data. If the CRC check indicates the data is correct, the data is forwarded to the appropriate Media Access Control (MAC) address.

In another type of network, commonly termed a cut-through-forwarding (CTF) network, only a small portion of the incoming frame is received and once the forwarding decision is made, the network component begins to send the incoming frame data to the appropriate egress ports. The forwarding decision may comprise a MAC address destination, or may comprise other information. The network component does not wait for the entire frame to be received before beginning to forward the frame to the appropriate destinations.

Cut-through forwarding is advantageous in many applications as it provides for low latency forwarding through a network component, and this low latency can be fixed and independent of frame size.

Cut-through forwarding may not detect and discard frames exposed to bit-errors before forwarding to the next destination in the network. A first network component may begin to forward the start of a frame before the end of frame is received at its ingress port, forwarding the frame at its egress port to the proper destination at a second network component. This second network component may receive the data frame at its ingress port, and similarly begin to forward the start of the frame before the end of the frame is received at its ingress port, forwarding the frame at its egress port to a third network component. In a similar manner, a data frame may be forwarded across many network components in a CTF network. When the end of the frame is received at the first network component, a CRC check may be performed. If an error is detected, that frame has already been forwarded to at least one destination. In a broadcast or multicast network implementation, erroneous data frames may be forwarded to many destinations in the network before errors are detected. Correcting these erroneous data frames increases the complexity of the network and increases latency. Additionally, a bit error in the frame fields used in the forwarding decision may cause data frames to be looped in the network as data frames are continually forwarded to incorrect destinations.

A mechanism is needed to prevent excess network traffic and unnecessary looping of data traffic in networks where cut-through forwarding is used.

SUMMARY

The examples herein enable a device, system and method for low-latency network forwarding eliminating excessive network traffic and unnecessary looping of data.

According to one aspect, the examples herein enable a device including an edge interface circuit to couple to a network component and to couple to a forwarder circuit. The edge interface circuit receives data frames from the network component, prepends a frame-specific information header to the received data frames and forwards the prepended data frames to the forwarder circuit. The edge interface circuit receives data frames from the forwarder circuit, removes duplicate data frames and forwards non-duplicate data frames to the network component. An internal interface circuit couples to an internal network segment and couples to the forwarder circuit, the internal interface circuit receives data frames from the internal network segment and forwards the received data frames to the forwarder circuit. The internal interface circuit receives data frames from the forwarder circuit, removes duplicate data frames and forwards non-duplicate data frames to the internal network segment.

According to one aspect, the examples herein enable a system including a network. The network includes a plurality of network connected devices. The network connected devices include an edge interface circuit coupled to a network component and coupled to a forwarder circuit, the edge interface circuit receives data frames from the network component, prepends a frame-specific information header to the received data frames and forwards the prepended data frames to the forwarder circuit. The edge interface circuit receives data frames from the forwarder circuit, removes duplicate data frames and forwards non-duplicate data frames to the network component. An internal interface circuit coupled to an internal network segment and coupled to the forwarder circuit, wherein the internal interface circuit receives data frames from the internal network segment and forwards the received data frames to the forwarder circuit. The internal interface circuit receives data frames from the forwarder circuit, removes duplicate data frames and forwards non-duplicate data frames to the internal network segment.

According to one aspect, the examples herein enable a method including the following operations: receiving a data frame at an edge interface circuit from a network component, generating a frame-specific information header based on the received data frame, prepending the frame-specific information header as a tag onto the received data frame to generate a prepended data frame, forwarding the prepended data frame to a forwarder circuit, receiving a data frame at an edge interface circuit from the forwarder circuit and discarding data frames with a detected error, identifying, based upon contents of a non-transitory memory and the frame-specific information header, duplicate received data frames, removing duplicate received data frames, removing the frame-specific information header from the non-duplicate received data frame to create an updated data frame, forwarding the updated data frame to a network destination through an egress port, receiving a data frame at an internal interface circuit from an internal network segment, forwarding the received data frame to the forwarder circuit, receiving a data frame at an internal interface circuit from the forwarder circuit, identifying, based upon contents of a non-transitory memory and the frame-specific information header, duplicate received data frames, removing duplicate received data frames, and forwarding non-duplicate data frames to a network component.

BRIEF DESCRIPTION OF THE DRAWINGS

The figures illustrate examples of systems for control of network traffic.

DETAILED DESCRIPTION

Figure 1:
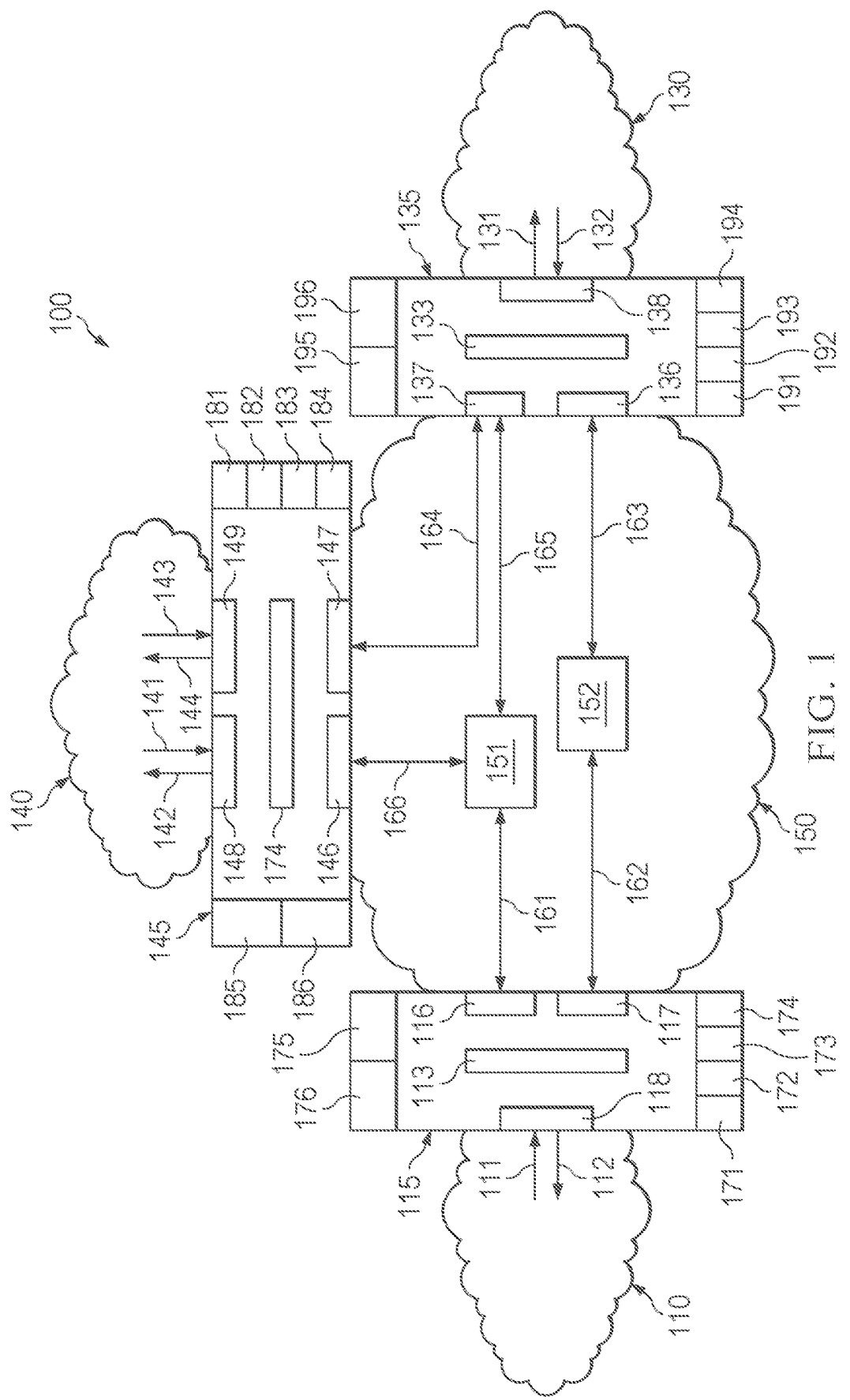
FIG. 1 illustrates one of various examples of a computer network.

FIG. 1 illustrates one of various examples of a computer network 100. The example of FIG. 1 includes network components 110, 130, and 140. Network components 110, 130 and 140 may include, but are not limited to bridges, switches and routers, without limitation. There is no requirement that network components 110, 130 and 140 be of the same type. Internal network segment 150 may include one or more network components, the one or more network components utilizing a CTF protocol. Edge circuits 115, 135, 145 may connect internal network segment 150 to, respectively, network components 110, 130, 140. Cut-through forwarder circuits 151 and 152 of internal network segment 150 may forward data frames between edge circuits 115, 135, 145 using a CTF protocol.

Network component 110 may be coupled to internal network segment 150 through edge circuit 115. Edge circuit 115 may include a first edge interface circuit 118 to communicate with network component 110 using a store-and-forward protocol. First edge interface circuit 118 may include at least one ingress port 111 and at least one egress port 112. First edge interface circuit 118 may receive data from network component 110 via ingress port 111. First edge interface circuit may send data to network component 110 via egress port 112. Edge circuit 115 may include one or more internal interface circuits 116, 117 to communicate with cut-through forwarder circuits 151 and 152 of internal network segment 150.

The example illustrated in FIG. 1 includes two cut-through forwarder circuits 151 and 152 of internal network segment 150, but this is not intended to be limiting. Other examples may include more cut-through forwarder circuits than those illustrated in FIG. 1 or may include fewer cut-through forwarder circuits than those illustrated in FIG. 1.

The specific configuration of network components and specific paths between network components as illustrated in FIG. 1 is for illustrative purposes and is not intended to be limiting.

Edge circuit 115 may receive a frame of data at first edge interface circuit 118 from network component 110 via ingress port 111. The frame of data received at edge circuit 115 may contain identification information. Edge circuit 115 may include an error detector circuit 172 to detect errors in the received data frame. Error detector circuit 172 may perform a CRC check or other error detection check on the received data frame. Edge circuit 115 may perform a CRC check or other error detection check on the received data frame. Edge circuit 115 may prepend a frame-specific information header to the received data frame to create a prepended data frame. The frame specific information header may be generated by identification circuit 175. Identification circuit 175 may be implemented in hardware or software, or a combination thereof. Identification circuit 175 may be integrated into first edge interface circuit 118, or may be separate component. The frame-specific information header may include the source MAC address for the received data frame. The frame-specific information header may include an identifier associated with the received data frame. This identifier may also be termed a frame number. The identifier or frame number may distinguish a first received data frame, received from a particular MAC address, from a second received data frame received from the same MAC address at an earlier or later point in time. The frame-specific information header may be part of a tag prepended to the received data frame to generate the prepended data frame. The tag may be prepended by tag insertion circuit 176. Tag insertion circuit 176 may be coupled to identification circuit 175, and may be implemented in hardware or software, or a combination thereof. Tag insertion circuit 176 may be integrated into first edge interface circuit 118, or may be a separate component. The prepended data frame with the prepended frame-specific information header may be forwarded to other destinations in the network. The prepended data frame with the prepended frame-specific information header may be forwarded to forwarder circuit 152 of internal network segment 150 via forwarder circuit 113, internal interface circuit 117 and path 162. The prepended data frame with the prepended frame-specific information header may be forwarded by forwarder circuit 113 to forwarder circuit 151 of internal network segment 150 via forwarder circuit 113, internal interface circuit 116 and path 161.

Edge circuit 115 may receive a frame of data at internal interface circuit 116 via path 161. The frame of data received at edge circuit 115 may contain identification information. Edge circuit 115 may update portions of the received data frame and forward the updated data frame to network component 110 using a S&F protocol via egress port 112. Edge circuit 115 may include an error detector circuit 172 to detect errors in the received data frame and discard data frames with a detected error. Error detector circuit 172 may perform a CRC check or other error detection check on the received data frame. If an error is detected, the frame may be discarded. Edge circuit 115 may read the portion of the received data frame comprising the frame-specific information header. The frame-specific information header may be present at a predetermined location in the received data frame. Edge circuit 115 may perform a lookup operation in cooperation with a Remove Duplicates Table (RDT) 171 in edge circuit 115 to determine if the frame-specific information header in the received data frame matches the frame-specific information header of a previous data frame that has already been forwarded. The frame-specific information header may be stored in RDT 171 in edge circuit 115. RDT 171 may be a non-transitory memory. If the frame-specific information header of the received data frame is listed in RDT 171, the received data frame may be discarded and not forwarded since it has already been forwarded through egress port 112. The lookup operation and discarding of duplicate data frames may be implemented by a duplicates removal circuit 173. Duplicates removal circuit 173 may be implemented in hardware or software, or a combination thereof. If the frame-specific information header of the received data frame is not listed in RDT 171, the data frame may be termed a non-duplicate data frame, and edge circuit 115 may add the frame-specific information header to RDT 171. After performing the lookup operation, edge circuit 115 may remove the frame-specific information header from the data frame to create an updated data frame. The removal of the frame-specific information header may be implemented by a tag removal circuit 174. Tag removal circuit 174 may be implemented in hardware or software, or a combination thereof. The updated data frame may be forwarded to first edge interface circuit 118 via forwarder circuit 113. The updated data frame may be forwarded to network component 110 via first edge interface circuit 118 at egress port 112.

Edge circuit 115 may receive a frame of data at internal interface circuit 117 via path 162. The frame of data received at edge circuit 115 may contain identification information. Edge circuit 115 may update portions of the received data frame and forward the updated data frame to network component 110 using a S&F protocol via egress port 112 in first edge interface circuit 118. Edge circuit 115 may include an error detector circuit 172 to detect errors in the received data frame and discard data frames with a detected error. Error detector circuit 172 may perform a CRC check or other error detection check on the received data frame. If an error is detected, the frame may be discarded. Edge circuit 115 may read the portion of the received data frame comprising the frame-specific information header. The frame-specific information header may be present at a predetermined location in the received data frame. Edge circuit 115 may perform a lookup operation in cooperation with RDT 171 to determine if the frame-specific information header matches the frame-specific information header of a previous data frame that has already been forwarded. If the frame-specific information header of the received data frame is listed in RDT 171, the received data frame may be discarded and not forwarded since it has already been forwarded through egress port 112 of first edge interface circuit 118. The lookup operation and discarding of duplicate data frames may be implemented by duplicates removal circuit 173. If the frame-specific information header of the received data frame is not listed in RDT 171, the data frame may be termed a non-duplicate data frame, and edge circuit 115 may add the frame-specific information header to RDT 171. After performing the lookup operation, edge circuit 115 may remove the frame-specific information header from the data frame to create an updated data frame. The removal of the frame-specific information header may be implemented by tag removal circuit 174. The updated data frame may be forwarded to first edge interface circuit 118 via forwarder circuit 113. The updated data frame may be forwarded to network component 110 at egress port 112.

Network component 140 may be coupled to edge circuit 145. Edge circuit 145 may include one or more edge interface circuits 148, 149 to communicate with network component 140 using a store-and-forward protocol. First edge interface circuit 148 may communicate with network component 140 via ingress port 141 and egress port 142. Second edge interface circuit 149 may communicate with network component 140 via ingress port 143 and egress port 144. Edge circuit 145 may include one or more internal interface circuits 146, 147 to communicate with other network components in internal network segment 150.

Edge circuit 145 may receive a frame of data at first edge interface circuit 148 from network component 140 via ingress port 141. Edge circuit 145 may include an error detector circuit 182 to detect errors in the received data frame. Error detector circuit 182 may perform a CRC check or other error detection check on the received data frame. The frame of data received at edge circuit 145 may contain identification information. Edge circuit 145 may prepend frame-specific information header in the received data frame to create a prepended data frame. The frame-specific information header may be generated by an identification circuit 185 of edge circuit 145. Identification circuit 185 may be implemented in hardware or software, or a combination thereof. Identification circuit 185 may be integrated into first edge interface circuit 148, or may be a separate component. The frame-specific information header may include an identifier associated with the received data frame. The frame-specific information header may be part of a tag prepended to the received data frame to generate a prepended data frame. The tag may be prepended by tag insertion circuit 186 of edge circuit 145. Tag insertion circuit 186 may be coupled to identification circuit 185, and may be implemented in hardware or software, or a combination thereof. The prepended data frame with the prepended frame-specific information header may be forwarded to cut-through forwarder circuit 151 of internal network segment 150 via forwarder circuit 174, internal interface circuit 146 and path 166. The prepended data frame with the prepended frame-specific information header may be forwarded to edge circuit 135 via forwarder circuit 174, internal interface circuit 147 and path 164.

Edge circuit 145 may receive a frame of data at second edge interface circuit 149 from network component 140 via ingress port 143. Edge circuit 145 may include an error detector circuit 182 to detect errors in the received data frame. Error detector circuit 182 may perform a CRC check or other error detection check on the received data frame. The frame of data received at edge circuit 145 may contain identification information. Edge circuit 145 may prepend a frame-specific information header in the received data frame to create a prepended data frame. The frame-specific information header may be generated by identification circuit 185. Identification circuit 175 may be integrated into second edge interface circuit 149, or may be a separate component. The frame-specific information header may include an identifier associated with the received data frame. The identifier may also be termed a frame number. The identifier or frame number may distinguish a first received data frame, received from a particular MAC address, from a second received data frame received from the same MAC address at an earlier or later point in time. The frame-specific information header may be part of a tag prepended to the frame of data. The tag may be inserted by tag insertion circuit 186. Tag insertion circuit 186 may be integrated into second edge interface circuit 149, or may be a separate component. The prepended data frame with the prepended frame-specific information header may be forwarded to other destinations in the network. The prepended data frame with the prepended frame-specific information header may be forwarded to edge circuit 135 via forwarder circuit 174, internal interface circuit 147 and path 164. The prepended data frame with the prepended frame-specific information header may be forwarded to cut-through forwarder circuit 151 of internal network segment 150 via forwarder circuit 174, internal interface circuit 146 and path 166.

Edge circuit 145 may receive a frame of data at first internal interface circuit 146 via path 166. Edge circuit 145 may include an error detector circuit 182 to detect errors in the received data frame and discard data frames with a detected error. Error detector circuit 182 may perform a CRC check or other error detection check on the received data frame. If an error is detected, the frame may be discarded. The frame of data received at edge circuit 145 may contain identification information. Edge circuit 145 may update portions of the received data frame and forward the updated data frame to network component 140 using a S&F protocol via egress port 142. Edge circuit 145 may read the portion of the received data frame comprising the frame-specific information header. Edge circuit 145 may perform a lookup operation in cooperation with RDT 181 in edge circuit 145 to determine if the frame-specific information header matches the frame-specific information header of a previous data frame that has already been forwarded. The frame-specific information header may be stored in RDT 181 in edge circuit 145. RDT 181 may be a non-transitory memory. If the frame-specific information header of the received data frame is listed in RDT 181, the received data frame may be discarded and not forwarded since it has already been forwarded via egress port 142. Edge circuit 145 may include an error detector circuit 182 to detect errors in the received data frame and discard data frames with a detected error. The lookup operation and discarding of duplicate data frames may be implemented by duplicates removal circuit 183 in edge circuit 145. Duplicates removal circuit 183 may be implemented in hardware or software, or a combination thereof. Duplicates removal circuit 183 may include a first circuit to detect duplicate data frames forwarded to egress port 142 and a second circuit to detect duplicate data frames forwarded to egress port 144. If the frame-specific information header of the received data frame is not listed in RDT 181, the data frame may be termed a non-duplicate data frame, and edge circuit 145 may add the frame-specific information header to RDT 181. After performing the lookup operation, edge circuit 145 may remove the frame-specific information header from the data frame to create an updated data frame. The removal of the frame-specific information header may be implemented by tag removal circuit 184 in edge circuit 145. The tag removal circuit 184 may be implemented in hardware or software, or a combination thereof. The updated data frame may be forwarded to first edge interface circuit 148 via forwarder circuit 174. The updated data frame may be forwarded to network component 140 via first edge interface circuit 148 at egress port 142.

Edge circuit 145 may receive a frame of data at internal interface circuit 147 via path 164. Edge circuit 145 may include an error detector circuit 182 to detect errors in the received data frame and discard data frames with a detected error. Error detector circuit 182 may perform a CRC check or other error detection check on the received data frame. If an error is detected, the frame may be discarded. The frame of data received at edge circuit 145 may contain identification information. Edge circuit 145 may update portions of the received data frame and forward the updated data frame to network component 140 using a S&F protocol via egress port 144. Edge circuit 145 may read the portion of the received data frame comprising the frame-specific information header. The frame-specific information header may be present at a predetermined location in the received data frame. Edge circuit 145 may perform a lookup operation in cooperation with RDT 181 to determine if the frame-specific information header matches the frame-specific information header of a previous data frame that has already been forwarded. The frame-specific information header may be stored in RDT 181 in edge circuit 145. RDT 181 may be a non-transitory memory. For data frames forwarded to egress port 144, if the frame-specific information header of the received data frame is listed in RDT 181, the received data frame may be discarded and not forwarded since it has already been forwarded through egress port 144. For data frames forwarded to egress port 142, if the frame-specific information header of the received data frame is listed in RDT 181, the received data frame may be discarded and not forwarded since it has already been forwarded through egress port 142. The lookup operation and discarding of duplicate data frames may be implemented by duplicates removal circuit 183. For data frames forwarded to egress port 144, if the frame-specific information header of the received data frame is not listed in RDT 181, the data frame may be termed a non-duplicate data frame, and edge circuit 145 may add the frame-specific information header to RDT 181. For data frames forwarded to egress port 142, if the frame-specific information header of the received data frame is not listed in RDT 181, the data frame may be termed a non-duplicate data frame, and edge circuit 145 may add the frame-specific information header to RDT 181. After performing the lookup operation, edge circuit 145 may remove the frame-specific information header from the data frame to create an updated data frame. The removal of the frame-specific information header may be implemented by tag removal circuit 184 in edge circuit 145. The updated data frame may be forwarded to second edge interface circuit 149 via forwarder circuit 174. The updated data frame may be forwarded to network component 140 via second edge interface circuit 149 at egress port 144.

Network component 130 may be coupled to edge circuit 135. Edge circuit 135 may include a first edge interface circuit 138 to communicate with network component 130 using a store-and-forward protocol. First edge interface circuit 138 may communicate with network component 130 via ingress port 132 and egress port 131. Edge circuit 135 may include one or more internal interface circuits 136, 137 to communicate with internal network segment 150.

Edge circuit 135 may receive a frame of data at first edge interface circuit 138 via ingress port 132. Edge circuit 135 may include an error detector circuit 192 to detect errors in the received data frame. Error detector circuit 192 may perform a CRC check or other error detection check on the received data frame. The frame of data received at edge circuit 135 may contain identification information. Edge circuit 135 may prepend a frame-specific information header in the received data frame to create a prepended data frame. The frame-specific information header may be generated by an identification circuit 195. Identification circuit 195 may be implemented in hardware or software, or a combination thereof. The frame-specific information header may include an identifier associated with the received data frame. This identifier may also be termed a frame number. The frame-specific information header may be part of a tag prepended to the received data frame to generate a prepended data frame. The tag may be prepended by tag insertion circuit 196. Tag insertion circuit 196 may be coupled to identification circuit 195, and may be implemented in hardware or software, or a combination thereof. Tag insertion circuit 196 may be integrated into first edge interface circuit 138, or may be a separate component. The prepended data frame with the prepended frame-specific information header may be forwarded to edge circuit 145 via forwarder circuit 133, internal interface circuit 137 and path 164. The prepended data frame with the prepended frame-specific information header may be forwarded to cut-through forwarder circuit 151 of internal network segment 150 via forwarder circuit 133, internal interface circuit 137 and path 165. The prepended data frame with the prepended frame-specific information header may be forwarded to cut-through forwarder circuit 152 of internal network segment 150 via forwarder circuit 133, internal interface circuit 136 and path 163.

Edge circuit 135 may receive a frame of data at first internal interface circuit 136 via path 163. Edge circuit 135 may include an error detector circuit 192 to detect errors in the received data frame and discard data frames with a detected error. Error detector circuit 192 may perform a CRC check or other error detection check on the received data frame. If an error is detected, the frame may be discarded. The frame of data received at edge circuit 135 may contain identification information. Edge circuit 135 may update portions of the received data frame and forward the updated data frame to network component 130 using a S&F protocol via egress port 131. Edge circuit 135 may read the portion of the received data frame comprising the frame-specific information header. The frame-specific information header may be present at a predetermined location in the received data frame. Edge circuit 135 may perform a lookup operation to determine if the frame-specific information header matches the frame-specific information header of a previous data frame that has already been forwarded. The frame-specific information header may be stored in RDT 191 in edge circuit 135. RDT 191 may be a non-transitory memory. If the frame-specific information header of the received data frame is listed in RDT 191, the received data frame may be discarded and not forwarded since it has already been forwarded through egress port 131. The lookup operation and discarding of duplicate data frames may be implemented by a duplicates removal circuit 193 of edge circuit 135. The duplicates removal circuit may be implemented in hardware or software, or a combination thereof. If the frame-specific information header of the received data frame is not listed in RDT 191, the data frame may be termed a non-duplicate data frame, and edge circuit 135 may add the frame-specific information header to RDT 191. After performing the lookup operation, edge circuit 135 may remove the frame-specific information header from the data frame to create an updated data frame. The removal of the frame-specific information header may be implemented by a tag removal circuit 194 of edge circuit 135. The tag removal circuit 194 may be implemented in hardware or software, or a combination thereof. The updated data frame may be forwarded to edge interface circuit 138 via forwarder circuit 133. The updated data frame may be forwarded to network component 130 via edge interface circuit 138 at egress port 131. Error detector circuit 192 may be included in duplicates removal circuit 193, or may be a separate circuit.

Edge circuit 135 may receive a frame of data at internal interface circuit 137 via path 164. Edge circuit 135 may receive data at internal interface circuit 137 via path 165. Edge circuit 135 may include an error detector circuit 192 to detect errors in the received data frame and discard data frames with a detected error. Error detector circuit 192 may perform a CRC check or other error detection check on the received data frame. If an error is detected, the frame may be discarded. The frame of data received at edge circuit 135 may contain identification information. Edge circuit 135 may update portions of the received data frame and forward the updated data frame to network component 130 using a S&F protocol via egress port 131. Edge circuit 135 may read the portion of the received data frame comprising the frame-specific information header. Edge circuit 135 may perform a lookup operation in cooperation with RDT 191 to determine if the frame-specific information header matches the frame-specific information header of a previous data frame that has already been forwarded. If the frame-specific information header of the received data frame is listed in RDT 191, the received data frame may be discarded and not forwarded since it has already been forwarded through egress port 131. If the frame-specific information header of the received data frame is not listed in RDT 191, the data frame may be termed a non-duplicate data frame, and edge circuit 135 may add the frame-specific information header to RDT 191. After performing the lookup operation, edge circuit 135 may remove the frame-specific information header from the data frame to create an updated data frame. The removal of the frame-specific information header may be implemented by tag removal circuit 194 in edge circuit 135. The updated data frame may be forwarded to edge interface circuit 138 via forwarder circuit 133. The updated data frame may be forwarded to network component 130 via edge interface circuit 138 via egress port 131.

The example illustrated in FIG. 1 is merely for illustrative purposes and is not intended to limit the invention. The example illustrated in FIG. 1 includes a specific number of network components, edge interface circuits, internal interface circuits, and network components, cut-through forwarder circuits of internal network segments and of edge circuits. The specific paths between network components, edge interface circuits, internal interface circuits, cut-through forwarder circuits, and edge circuits illustrated in FIG. 1 is for illustrative purposes and is not intended to limit the invention.

Other examples not illustrated in FIG. 1 may include more network components than the number of network components illustrated in FIG. 1. Other examples not illustrated in FIG. 1 may include fewer network components than the number of network components illustrated in FIG. 1.

Other examples not illustrated in FIG. 1 may include more edge circuits than the number of edge circuits illustrated in FIG. 1. Other examples not illustrated in FIG. 1 may include fewer edge circuits than the number of edge circuits illustrated in FIG. 1.

Other examples not illustrated in FIG. 1 may include more edge interface circuits than the number of edge interface circuits illustrated in FIG. 1. Other examples not illustrated in FIG. 1 may include fewer edge interface circuits than the number of edge interface circuits illustrated in FIG. 1.

Other examples not illustrated in FIG. 1 may include more internal interface circuits than the number of internal interface circuits illustrated in FIG. 1. Other examples not illustrated in FIG. 1 may include fewer internal interface circuits than the number of internal interface circuits illustrated in FIG. 1.

Other examples not illustrated in FIG. 1 may include more network components than the number of network components illustrated in FIG. 1. Other examples not illustrated in FIG. 1 may include fewer network components than the number of network components illustrated in FIG. 1.

Other examples not illustrated in FIG. 1 may include different network components than the specific network components illustrated in FIG. 1.

Figure 2:
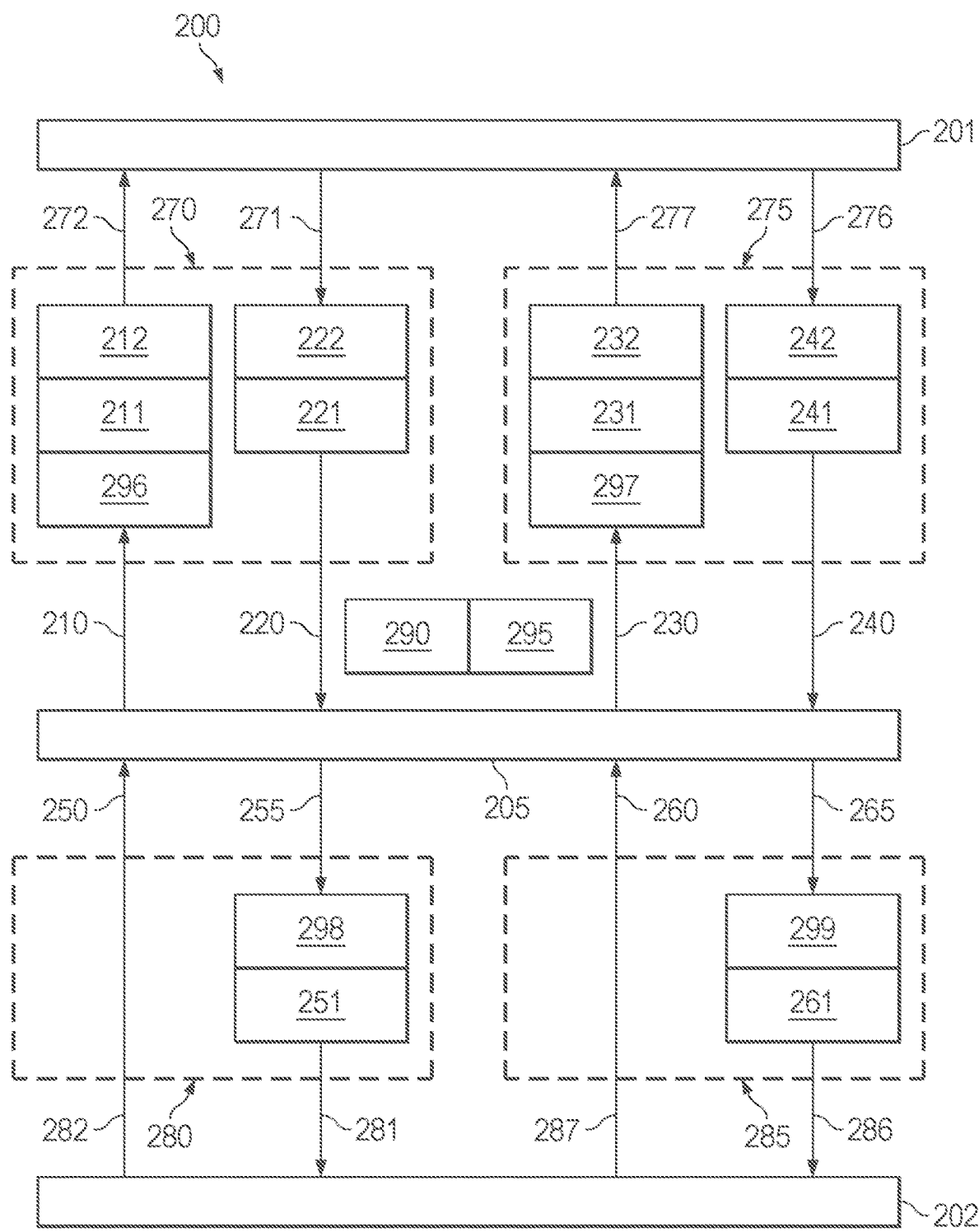
FIG. 2 illustrates one of various examples of an edge circuit.

FIG. 2 illustrates one of various examples of an edge circuit 200. Edge circuit 200 may represent one of various examples of edge circuit 145 as illustrated in FIG. 1. In the example of FIG. 2, first edge interface circuit 270 and second edge interface circuit 275 may interface with a network component 201, and first internal interface circuit 280 and second internal interface circuit 285 may interface with internal network segment 202. Internal network segment 202 may be one of various examples of internal network segment 150, as illustrated and described in reference to FIG. 1.

Edge circuit 200 may include RDT 290. RDT 290 may be a non-transitory memory. In one of various examples, first edge interface circuit 270, second edge interface circuit 275, first internal interface circuit 280 and second internal interface circuit 285 may respectively include an RDT. In one of various examples, an RDT may be shared by more than one of first edge interface circuit 270, second edge interface circuit 275, first internal interface circuit 280 and second internal interface circuit 285.

First edge interface circuit 270 may include error detector circuit 296. Error detector circuit 296 may generate an output signal based on detection of an error. Second edge interface circuit 275 may include error detector circuit 297. Error detector circuit 297 may generate an output signal based on detection of an error. First internal interface circuit 280 may include error detector circuit 298. Error detector circuit 298 may generate an output signal based on detection of an error. Second internal interface circuit 285 may include error detector circuit 299. The example illustrated in FIG. 2 illustrates a separate error detector circuit for, respectively, first edge interface circuit 270, second edge interface circuit 275, first internal interface circuit 280 and second internal interface circuit 285, but this is not intended to be limiting. In one of various examples, a single error detector circuit may be shared by more than one of first edge interface circuit 270, second edge interface circuit 275, first internal interface circuit 280 and second internal interface circuit 285.

Forwarder circuit 205 may receive data from first edge interface circuit 270, second edge interface circuit 275, first internal interface circuit 280 and second internal interface circuit 285 and may forward the received data to the proper destination.

First edge interface circuit 270 may receive a data frame from forwarder circuit 205 via path 210. The data frame may be received by error detector circuit 296. Error detector circuit 296 may check for errors in the data frame and may discard frames with detected errors. Checking for errors may be a CRC check or another error check technique. Error detector circuit 296 may detect errors in the data frame and may provide an error output to duplicates removal circuit 211. Duplicates removal circuit 211 may remove data frames with errors based on the error output. Duplicates removal circuit 211 may include a controller circuit to perform a lookup operation to determine if the frame-specific information header of the received frame of data matches the frame-specific information header of a previous frame of data that has already been forwarded at egress port 272. Alternately, operation of duplicates removal circuitry 211 may be responsive to controller 295. If the frame-specific information header of the received data is listed in RDT 290, the received frame is discarded by duplicates removal circuit 211 and not forwarded since it has already been forwarded through egress port 272. If the frame-specific information header of the received data is not listed in RDT 290, the data frame may be termed a non-duplicate data frame, and controller circuit 295 may add the frame-specific information header to RDT 290. Tag removal circuit 212 may remove the frame-specific information header from the frame and forward the updated frame from first edge interface circuit 270 to network component 201 at egress port 272. Error detector circuit 296 may be included in duplicates removal circuit 211, or may be a separate circuit as illustrated in FIG. 2.

First edge interface circuit 270 may receive a frame of data from network component 201 via ingress port 271. Ingress port 271 may be coupled to identification circuit 222. Identification circuit 222 may prepend a frame-specific information header to the received data frame. The frame-specific information header may include an identifier associated with the received data frame. This identifier may also be termed a frame number. The identifier or frame number may distinguish a first received data frame, received from a particular MAC address, from a second received data frame received from the same MAC address at an earlier or later point in time. Identification circuit 222 may be coupled to tag insertion circuit 221. Tag insertion circuit 221 may combine the frame-specific information header with the received data frame to create a prepended data frame. The prepended data frame may be forwarded through path 220 to forwarder circuit 205 for forwarding to other destinations on the network.

Second edge interface circuit 275 may receive a frame of data from forwarder circuit 205 via path 230. Network component 201 may interface to second edge interface circuit 275. The data frame may be received by error detector circuit 297. Error detector circuit 297 may check for errors in the data frame and may provide an error output to duplicates removal circuit 231. Checking for errors may be a CRC check or another error check technique. Duplicates removal circuit 231 may remove data frames with errors based on the error output. Duplicates removal circuit 231 may include a controller circuit to perform a lookup to determine if the frame-specific information header of the received frame of data matches the frame-specific information header of a previous frame of data that has already been received. Alternately, operation of duplicates removal circuit 231 may be responsive to controller 295. If the frame-specific information header of the received data is listed in RDT 290, the received frame is discarded by duplicates removal circuit 231 and not forwarded since it has already been forwarded through egress port 277. If the frame-specific information header of the received data is not listed in RDT 290, the data frame may be termed a non-duplicate data frame, and controller circuit 295 may add the frame-specific information header to RDT 290. Tag removal circuit 232 may remove the frame-specific information header from the frame and forward the updated frame from second edge interface circuit 275 at egress port 277. Error detector circuit 297 may be included in duplicates removal circuit 231, or may be a separate circuit as illustrated in FIG. 2.

Second edge interface circuit 275 may receive a frame of data via ingress port 276. Ingress port 276 may be coupled to identification circuit 242. Identification circuit 242 may prepend a frame-specific information header to the received frame. The frame-specific information header may include an identifier associated with the received data frame. This identifier may also be termed a frame number. The identifier or frame number may distinguish a first received data frame, received from a particular MAC address, from a second received data frame received from the same MAC address at an earlier or later point in time. Identification circuit 242 may be coupled to tag insertion circuit 241. Tag insertion circuit 241 may prepend the frame-specific information header to the received data to create a prepended data frame. The prepended data frame including the frame-specific information header may be forwarded through path 240 to forwarder circuit 205 for forwarding to other destinations on the network.

Edge circuit 200 may receive a data frame from internal network segment 202 at first internal interface circuit 280 via first ingress port 282. The received data frame may be forwarded to forwarder circuit 205 via first egress port 250.

First internal interface circuit 280 may forward a data frame over second egress port 281. The data frame may be received from forwarder circuit 205 via second ingress port 255. The data frame may be received by error detector circuit 298. Error detector circuit 298 may check for errors in the data frame and may provide an error output to duplicates removal circuit 251. Checking for errors may be a CRC check or another error check technique. Duplicates removal circuit 251 may remove data frames with errors based on the error output. Duplicates removal circuit 251 may read the portion of the received data frame comprising the frame-specific information header. Duplicates removal circuit 251 may include a controller circuit to perform a lookup operation and determine if the frame-specific information header of the received frame of data matches the frame-specific information header of a previous frame of data that has already been received and forwarded by second egress port 281. Alternately, operation of duplicates removal circuit 251 may be responsive to controller 295. If the frame-specific information header of the received data is listed in RDT 290, the received frame is discarded and not forwarded since it has already been forwarded through second egress port 281. If the frame-specific information header of the received data is not listed in the RDT 290, the data frame may be termed a non-duplicate data frame, and controller circuit 295 may add the information to the RDT 290. First internal interface circuit 280 may forward the frame via second egress port 281. Error detector circuit 298 may be included in duplicates removal circuit 251, or may be a separate circuit as illustrated in FIG. 2.

Edge circuit 200 may receive a data frame from internal network segment 202 at second internal interface circuit 285 via first ingress port 287. Received data may be forwarded to forwarder circuit 205 via first egress port 260.

Second internal interface circuit 285 may forward a data frame over second egress port 286. Data may be received from forwarder circuit 205 via second ingress port 265. The data frame may be received by error detector circuit 299. Error detector circuit 299 may check for errors in the data frame and may provide an error output to duplicates removal circuit 261. Checking for errors may be a CRC check or another error check technique. Duplicates removal circuit 261 may remove data frames with errors based on the error output. Duplicates removal circuit 261 may read the portion of the received data frame comprising the frame-specific information header. Duplicates removal circuit 261 may include a controller circuit to perform a lookup to determine if the frame-specific information header matches the frame-specific information of a previous frame of data that has already been forwarded by second egress port 286. Alternately, operation of duplicates removal circuit 231 may be responsive to controller 295. If the frame-specific information header of the received data is listed in RDT 290, the received frame is discarded and not forwarded since it has already been forwarded through second egress port 286. If the frame-specific information header of the received data is not listed in the RDT 290, the data frame may be termed a non-duplicate data frame, and controller circuit 295 may add the frame-specific information header to RDT 290. Second egress port 286 may forward the data to internal network segment 202. Error detector circuit 299 may be included in duplicates removal circuit 261, or may be a separate circuit as illustrated in FIG. 2.

Figure 3:
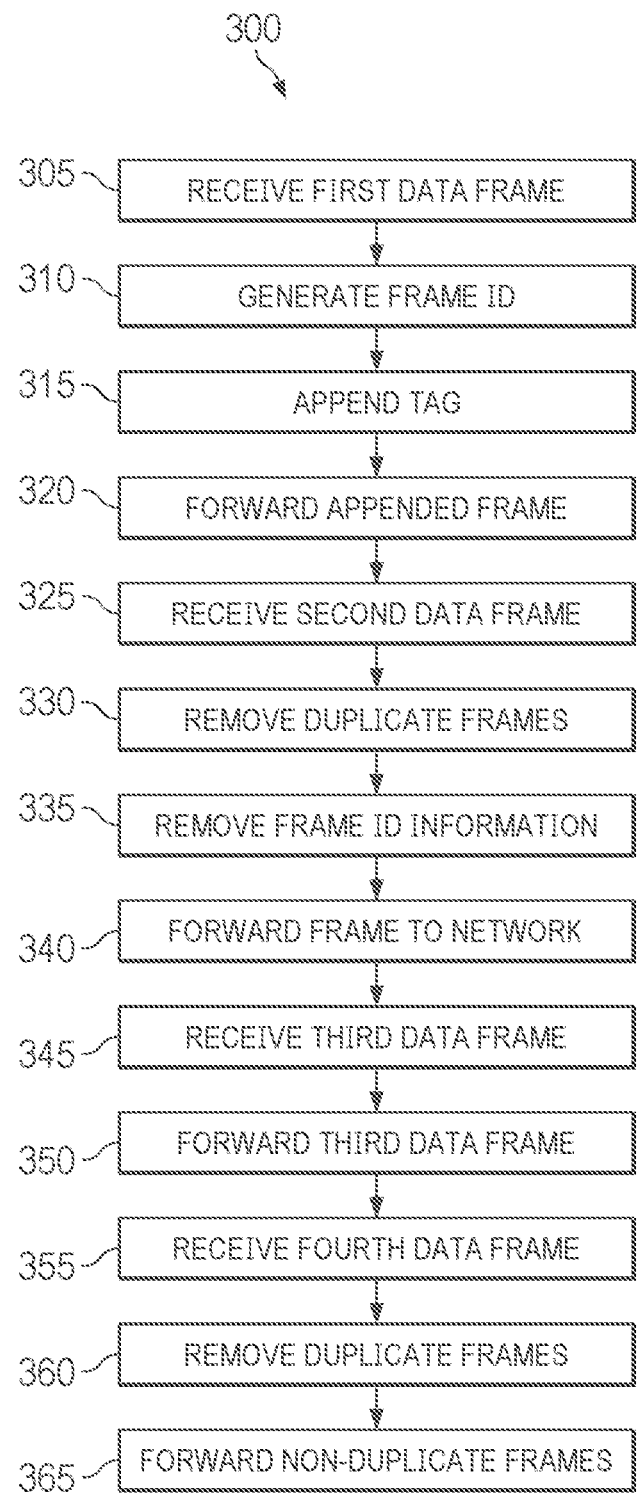
FIG. 3 illustrates a method for control of network traffic.

FIG. 3 illustrates a method for control of network traffic. A device as previously illustrated and described in reference to FIG. 2 may execute the illustrated method.

At operation 305, a data frame may be received by an edge interface circuit from a network component.

At operation 310, the edge interface circuit may generate frame identification information associated with the data frame. The frame-specific information header may include an identifier for the received data frame. This identifier may also be termed a frame number. The identifier or frame number may distinguish a first received data frame, received from a particular MAC address, from a second received data frame received from the same MAC address at an earlier or later point in time.

At operation 315, frame-specific information header may be prepended as a tag onto the received data frame to generate a prepended data frame.

At operation 320, the prepended data frame may be forwarded to a forwarder circuit.

At operation 325, a data frame may be received at an edge interface circuit from the forwarder circuit. The data frame received at the edge interface circuit may be a prepended data frame as described in reference to operations 305 through 320, inclusive. An error detection operation may be performed on the received data frame and data frames with detected errors may be removed.

At operation 330, duplicate data frames received at the edge interface circuit may be selectively removed. The frame-specific information header may be read from a portion of the received data frame. The frame-specific information header may be present at a predetermined location in the received data frame. A lookup operation may determine if the frame-specific information header in the received data frame matches the frame-specific information header of a previous data frame that has already been forwarded. The frame-specific information header may be stored in an RDT. If the frame-specific information header of the received data frame is listed in the RDT, the received data frame may be discarded and not forwarded since it has already been forwarded.

At operation 335, the frame-specific information header may be removed from the received data frame to create an updated data frame if the received data frame is not a duplicate.

At operation 340, the updated data frame may be forwarded to a network component through an egress port.

At operation 345, a data frame may be received at an internal interface circuit from a network component. At operation 350, the received data frame may be forwarded to a forwarder circuit.

At operation 355, a data frame may be received at an internal interface circuit from a forwarder circuit. The data frame received at the internal interface circuit may be a prepended data frame as described in reference to operations 305 to 320, inclusive. An error detection operation may be performed on the received data frame and data frames with detected errors may be removed. At operation 360, if the received data frame is a duplicate data frame, the received data frame may be selectively removed. Frame-specific information header may be read from a portion of the received data frame. Frame-specific information header may be present at a predetermined location in the received data frame. A lookup operation may determine if the frame-specific information header in the received data frame matches the frame-specific information header of a previous data frame that has already been forwarded. The frame-specific information header may be stored in an RDT. If the frame-specific information header of the received data frame is listed in the RDT, the received data frame may be discarded and not forwarded since it has already been forwarded.

At operation 365, non-duplicate received data frames may be forwarded to a network component.

The invention claimed is:

1. A device comprising:
an edge interface circuit to couple to a network component and to couple to a forwarder circuit, the edge interface circuit to:
receive data frames from the network component, prepend a frame-specific information header to the received data frames and forward the prepended data frames to the forwarder circuit;
receive data frames from the forwarder circuit, remove duplicate data frames and forward non-duplicate data frames to the network component;
an internal interface circuit to couple to an internal network segment and to couple to the forwarder circuit, the internal interface circuit to:
receive data frames from the internal network segment and forward the received data frames to the forwarder circuit, and
receive data frames from the forwarder circuit, remove duplicate data frames and forward non-duplicate data frames to the internal network segment.

2. The device as claimed in claim 1, the edge interface circuit comprising:
an ingress port to couple to the network component, the ingress port to receive data frames;
an identification circuit to couple to the first ingress port, the identification circuit to generate a frame-specific information header based at least on the received data frames, and
a tag insertion circuit to couple to the identification circuit, the tag insertion circuit to prepend the frame-specific information header to the received data frames to generate prepended data frames, the tag insertion circuit to forward the prepended data frames to the forwarder circuit.

3. The device as claimed in claim 2, the edge interface circuit comprising:
an error detector circuit to receive data frames from the forwarder circuit;
a duplicates removal to remove duplicate data frames based at least on the contents of a non-transitory memory and the frame-specific information header;
a tag removal circuit to couple to the duplicates removal circuit, the tag removal circuit to remove the frame-specific information header in received data frames to generate updated data frames, and
an egress port to couple to the tag removal circuit, the egress port to forward the updated data frames to the network component.

4. The device as claimed in claim 3, wherein the duplicates removal circuit comprises a controller circuit to search the contents of the non-transitory memory for the presence of a portion of a received data frame within the non-transitory memory contents.

5. The device as claimed in claim 3, the duplicates removal circuit to remove received data frames based on an output of the error detector circuit.

6. The device as claimed in claim 1, the internal interface circuit comprising:
a first ingress port to couple to an internal network segment, and to couple to the forwarder circuit, the first ingress port to receive data frames from the internal network segment and to forward received data frames to the forwarder circuit through a first egress port;
a second ingress port to couple to the forwarder circuit, the second ingress port to receive data frames from the forwarder circuit;
an error detector circuit to couple to the second ingress port;
a duplicates removal circuit to couple to the error detector circuit, the duplicates removal circuit to remove duplicate received data frames based at least on the contents of a non-transitory memory and the frame-specific information header, and
a second egress port to forward non-duplicate data frames to the internal network segment.

7. The device as claimed in claim 6, wherein the duplicates removal circuit comprises a controller circuit to search the contents of the non-transitory memory for the presence of a portion of the received data frame within the non-transitory memory contents.

8. The device as claimed in claim 6, the duplicates removal circuit to remove received data frames based on an output of the error detector circuit.

9. A system comprising:
a network comprising:
a plurality of network connected devices, comprising:
an edge interface circuit to couple to a network component and to couple to a forwarder circuit, the edge interface circuit to:
receive data frames from the network component, prepend a frame-specific information header to the received data frames and forward the prepended data frames to the forwarder circuit;
receive data frames from the forwarder circuit, remove duplicate data frames and forward non-duplicate data frames to the network component;
an internal interface circuit to couple to an internal network segment and to couple to the forwarder circuit, the internal interface circuit to:
receive data frames from the internal network segment and forward the received data frames to the forwarder circuit, and
receive data frames from the forwarder circuit, remove duplicate data frames and forward non-duplicate data frames to the internal network segment.

10. The system as claimed in claim 9, the edge interface circuit comprising:
an ingress port to couple to the network component, the ingress port to receive data frames;
an identification circuit to couple to the first ingress port, the identification circuit to generate a frame-specific information header based at least on the received data frames, and
a tag insertion circuit to couple to the identification circuit, the tag insertion circuit to prepend the frame-specific information header to the received data frames to generate prepended data frames, the tag insertion circuit to forward the prepended data frames to the forwarder circuit.

11. The system as claimed in claim 10, the edge interface circuit comprising:
an error detector circuit to receive data frames from the forwarder circuit;

a duplicates removal circuit to receive data frames from the error detector circuit, the duplicates removal circuit to remove duplicate data frames based at least on the contents of a non-transitory memory and the frame-specific information header;

a tag removal circuit to couple to the duplicates removal circuit, the tag removal circuit to remove the frame-specific information header in received data frames to generate updated data frames, and an egress port to couple to the tag removal circuit, the egress port to forward the updated data frames to the network component.

12. The system as claimed in claim 11, wherein the duplicates removal circuit comprises a controller circuit to search the contents of the non-transitory memory for the frame-specific information header within the non-transitory memory contents.

13. The system as claimed in claim 11, the duplicates removal circuit to remove received data frames based on an output of the error detector circuit.

14. The system as claimed in claim 11, the internal interface circuit comprising:
- a first ingress port to couple to an internal network segment, and to couple to the forwarder circuit, the first ingress port to receive data frames from the internal network segment and to forward the received data frames to the forwarder circuit through a first egress port;
- a second ingress port to couple to the forwarder circuit, the second ingress port to receive data frames from the forwarder circuit;
- an error detector circuit to couple to the second ingress port;
- a duplicates removal circuit to couple to the error detector circuit, the duplicates removal circuit to remove duplicate received data frames based at least on the contents of a non-transitory memory and the frame-specific information header, and
- a second egress port to forward non-duplicate data frames to the internal network segment.

15. The system as claimed in claim 14, wherein the duplicates removal circuit comprises a controller circuit to search the contents of the non-transitory memory for the presence of the frame-specific information header within the non-transitory memory contents.

16. The system as claimed in claim 14, the duplicates removal circuit to remove received data frames based on an output of the error detector circuit.

17. A method comprising:
- receiving a data frame at an edge interface circuit from a network component;
- generating a frame-specific information header based on the received data frame;
- prepending the frame-specific information header as a tag onto the received data frame to generate a prepended data frame;
- forwarding the prepended data frame to a forwarder circuit;
- receiving a data frame at an edge interface circuit from the forwarder circuit and discarding data frames with a detected error;
- identifying, based upon contents of a non-transitory memory and the frame-specific information header, duplicate received data frames;
- removing duplicate received data frames;
- removing the frame-specific information header from the non-duplicate received data frame to create an updated data frame;
- forwarding the updated data frame to a network destination through an egress port;
- receiving a data frame at an internal interface circuit from an internal network segment;
- forwarding the received data frame to the forwarder circuit;
- receiving a data frame at an internal interface circuit from the forwarder circuit;
- identifying, based upon contents of a non-transitory memory and the frame-specific information header, duplicate received data frames;
- removing duplicate received data frames, and
- forwarding non-duplicate data frames to a network component.

18. The method as claimed in claim 17, wherein removing duplicate received data frames comprises a controller circuit to search the contents of the non-transitory memory for the frame-specific information header within the non-transitory memory contents.

* * * * *